United States Patent
Stöhr et al.

(10) Patent No.: US 11,184,343 B2
(45) Date of Patent: *Nov. 23, 2021

(54) METHOD FOR CARRYING OUT AN AUTHENTICATION

(71) Applicant: GIESECKE+DEVRIENT MOBILE SECURITY GMBH, Munich (DE)

(72) Inventors: Volker Stöhr, Munich (DE); Frank-Michael Kamm, Holzkirchen (DE); Nils Gerhardt, Munich (DE); Andreas Chalupar, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 185 days.

This patent is subject to a terminal disclaimer.

(21) Appl. No.: 16/481,157

(22) PCT Filed: Jan. 29, 2018

(86) PCT No.: PCT/EP2018/000040
§ 371 (c)(1),
(2) Date: Jul. 26, 2019

(87) PCT Pub. No.: WO2018/137888
PCT Pub. Date: Aug. 2, 2018

(65) Prior Publication Data
US 2020/0127858 A1    Apr. 23, 2020

(30) Foreign Application Priority Data

Jan. 27, 2017 (DE) .................... 10 2017 000 768.3

(51) Int. Cl.
*H04L 9/32* (2006.01)
*H04L 29/06* (2006.01)

(52) U.S. Cl.
CPC ........ *H04L 63/0807* (2013.01); *H04L 9/3213* (2013.01); *H04L 9/3226* (2013.01);
(Continued)

(58) Field of Classification Search
CPC . H04L 63/0807; H04L 9/3213; H04L 9/3226; H04L 9/3234; H04L 9/3271;
(Continued)

(56) References Cited

U.S. PATENT DOCUMENTS 9,935,953 B1 * 4/2018 Costigan ............. H04L 63/0876
10,142,338 B2 * 11/2018 Hall ......................... G06F 21/31
(Continued)

FOREIGN PATENT DOCUMENTS

DE   102011089580 B3   4/2013
WO   2007114710 A2     10/2007
(Continued)

OTHER PUBLICATIONS

An Authorization Scheme Concealing Client's Access from Authentication Server, Saito et al, Jul. 2016 (Year: 2016).*
(Continued)

*Primary Examiner* — Jahangir Kabir
(74) *Attorney, Agent, or Firm* — Workman Nydegger

(57) ABSTRACT

A method is provided for carrying out a cryptographically secured authentication which complies with the Universal Authentication Framework (UAF) of the FIDO Alliance. It is thus possible to employ an existing infrastructure of the FIDO Alliance and the method can be embedded into the infrastructure using standard interfaces.

17 Claims, 8 Drawing Sheets

(52) U.S. Cl.
CPC .......... *H04L 9/3234* (2013.01); *H04L 9/3271* (2013.01); *H04L 63/0428* (2013.01); *H04L 63/0853* (2013.01); *H04L 63/123* (2013.01); *H04L 2463/082* (2013.01)

(58) Field of Classification Search
CPC ............. H04L 63/0428; H04L 63/0853; H04L 63/123; H04L 2463/082
USPC ........................................................ 713/168
See application file for complete search history.

(56) References Cited

U.S. PATENT DOCUMENTS

| | | | | |
|---|---|---|---|---|
| 2011/0022835 | A1* | 1/2011 | Schibuk | G06Q 20/382 713/153 |
| 2013/0054474 | A1 | 2/2013 | Yeager | |
| 2013/0080769 | A1 | 3/2013 | Cha et al. | |
| 2014/0189350 | A1 | 7/2014 | Baghdasaryan et al. | |
| 2014/0189360 | A1 | 7/2014 | Baghdasaryan et al. | |
| 2014/0351589 | A1 | 11/2014 | Chenna | |
| 2015/0180869 | A1 | 6/2015 | Verma | |
| 2016/0087957 | A1 | 3/2016 | Shah et al. | |
| 2018/0107813 | A1* | 4/2018 | Perotti | G06F 21/32 |
| 2019/0097802 | A1* | 3/2019 | Rowe | H04L 9/3213 |
| 2019/0364032 | A1* | 11/2019 | Stohr | H04L 9/3271 |

FOREIGN PATENT DOCUMENTS

| | | |
|---|---|---|
| WO | 2016044373 A1 | 3/2016 |
| WO | 2016105553 A1 | 6/2016 |

OTHER PUBLICATIONS

International Search Report for PCT Application No. PCT/EP2018/000040, dated May 22, 2018.
International Search Report for PCT Application No. PCT/EP2018/000041, dated May 22, 2018.
German Search Report for DE Application No. 102017000768.3, dated Apr. 10, 2017.
"Personalausweis (Deutschland)." Wikipedia, Wikimedia Foundation, Dec. 5, 2018, https://de.wikipedia.org/wiki/Personalausweis_(Deutschland).
"U2F." Wikipedia, Wikimedia Foundation, Jun. 6, 2019, https://de.wikipedia.org/wiki/U2F.

* cited by examiner

METHOD FOR CARRYING OUT AN AUTHENTICATION

BACKGROUND

The invention relates to a method for carrying out a cryptographically secured authentication, which complies with the Universal Authentication Framework UAF of the FIDO Alliance. In this manner, an existing infrastructure created according to the specifications of the FIDO Alliance can be employed and the proposed method can be embedded in the infrastructure using standard interfaces.

The present invention further relates to a method for carrying out a two-factor authentication between a client and a relying party.

A client is, for example, a mobile telephone, a tablet PC, a computer (PC) or the like. By way of example, a relying party can be a facility such as a host, a server, or the like that makes possible access to a service, in particular a secure software application.

The Universal Authentication Framework UAF supplies a universal framework for authentication, wherein it is possible to carry out an authentication without a password. For example, this framework supports biometric features. While according to the FIDO standards two variants exist, namely Universal Authentication Framework UAF and Universal 2nd Factor U2F, according to the UAF standard the user authenticates himself vis-à-vis his personal mobile terminal by means of his knowledge, such as, for example, a PIN or a password and/or biometric features.

In the two-factor authentication, the industry standard U2F (Universal Second Factor) is preferably used. The U2F specification is managed by the FIDO Alliance (Fast Identity Online).

The so-called Universal Authentication Framework UAF, which is standardized by the FIDO Alliance, is known. Corresponding specifications are freely available on the website https://fidoalliance.org/download/. This applies to both the UAF specifications and the U2F specifications. In particular, in addition to the UAF specification 1.1, the further specifications FIDO UAF Protocol Specification and FIDO 2.0 specifications can be downloaded.

The two-factor authentication is usually initiated by a service provider (relying party) asking, as the first factor, for the user name and possibly for the associated password for authentication, wherein the user name identifies the user and the password authenticates the user. The service provider checks these data and, if the data are in order, commences the verification of the second factor (possession) in the form of U2F.

In a first step, the service provider (relying party) sends a data packet to a customer computer, such as, for example, a web browser. This packet includes a challenge, which is some randomly chosen data, an application identifier (App-ID), and a key identifier (KeyHandle), which was deposited upon the initial login.

The customer computer checks the application identifier, supplements this by additional data, such as, for example, a channel identifier (channel ID), and forwards these data in hashed form to the U2F device. For example, the U2F device can be a USB dongle with a button.

The U2F device ascertains, with the aid of the key identifier (KeyHandle), the private key (kpriv) matching for this session, and with said key signs the hashed values of the application identifier and of the challenge, thus forming the signed return response.

In addition, a counter is integrated into the response to be able to recognize duplicated U2F devices. The customer computer, such as, for example, the web browser, forwards these data to the service provider, who checks the signatures and the data contained therein with the PublicKey, and, if these data are in order, grants the access.

An intricacy of FIDO-U2F is that it is laid out to be used on a PC or the like, where also a USB dongle can be inserted as a second factor in a USB interface. Although it is possible to present the second factor via NFC or Bluetooth, in this case special authenticators are required, which usually have to be acquired specifically and exclusively for employment for FIDO.

However, there is a desire to be able to effect a two-factor authentication compliant with FIDO-U2F also on further electronic facilities such as, for example, a mobile telephone. In this respect, there is a further desire to be able to use as the second factor a data carrier with a contactless interface, such as, for example, a credit card, already held by the user in connection with a mobile telephone to carry out a two-factor authentication according to FIDO-U2F.

FIDO-U2F requires the employment of elliptic curves for signing. Credit cards or payment cards generally do not have this function. Alternatively, the utilization of RSA for signing according to FIDO-UAF is permitted. In addition to the RSA signing, FIDO also requires the generation of RSA key pairs. This generation of RSA keys would absorb too much computing time on the card, so that the execution time would be unacceptable to the user, and is not implemented on current credit cards.

Alternatively, the new national identity card of the FRG (nPA) could be used as the second factor and be coupled to the mobile telephone by radio connection. However, the eID functionality is currently enabled only in 30-35% of the identity cards in the field. Furthermore, upon each utilization, the eID functionality requires the additional input of a six-digit password, which must be input while holding the nPA to the NFC interface of the mobile telephone.

The existing payment card platforms are not suitable as FIDO authenticators or only with greater disadvantages. FIDO requires elliptic curves that are not present on payment cards. The UAF protocol also makes possible the use of RSA, but the RSA key generation is likewise absent on the payment cards and would be very slow in addition. The larger key lengths also result in significantly longer transaction times via the NFC interface.

With FIDO UAF, the user needs a device, thus a terminal, which offers the possibility of generating and securely storing a cryptographic key for the authentication. The employment of the cryptographic key must be secured through authentication, for example password input.

The key can either be stored on the device with which the authentication is carried out, with the disadvantage that the key is bound to the device and, depending on the type of storage (in software or additionally secured by hardware-based components in the device), with the risk of the key being spied out or employed without authorization.

Alternatively, the key can be generated and stored on a second device (for example an NFC card held to the smart phone), with the disadvantage that a second device must be purchased and kept ready. The additional device must supply sufficient storage capacity for storing multiple keys and must supply the possibility to secure the access to the key, for example by means of a password, and supply the key's management.

For the UAF authentication, a device should be used that the user already possesses anyway. The system should be set up such that also such devices that were not devised for FIDO can be used as the primary authentication factor. In addition to the device, the system should require also an authentication of the user (for example by means of a password) vis-à-vis the device. The method should be carried out in such a manner that the approval of the issuer of the device is not absolutely necessary. The method should be secure against Trojans on the "client" (i.e. smart phone, tablet or PC). The relying party should see no difference to the standardized FIDO method, so that existing FIDO server infrastructure can continue to be employed.

Further, it should be possible to carry out a FIDO authentication with the aid of an EMV card. According to known methods, a signature with elliptic curves must be computed in order to carry out the authentication, wherein the EMV cards are not capable of doing so. EMV cards are credit cards or smart cards according to the EMV specification for payment cards. These cards have a processor chip and are laid out for the associated chip card devices, thus point of sale terminals and cash machines. EMV stands for the developers Europay International, Mastercard and Visa.

SUMMARY

The invention has for its object to propose a method which makes possible an authentication, wherein, by means of standardized interfaces, as little technical effort as possible is required. Moreover, it is an object of the present invention that the method to be proposed has possibilities to compute complex operations, even if these are not to be computed solely by a credit card itself. Moreover, the method should run in particularly forgery-proof manner and an input of an incorrect PIN should not make it directly apparent that a failed authentication is actually solely due to the incorrectly input PIN. The same applies to the procurement of an unidentifiable EMV card or the attempted authentication vis-à-vis an incorrect relying party.

This object is achieved by a method according to the independent claim 1. Preferred embodiments of the method can be found in the subclaims.

Accordingly, a method is proposed for carrying out a cryptographically secured authentication between a client and a relying party, which comprises the following steps. Thus, there is effected a query of the authentication by the client at the relying party, a transmission of a first challenge message, a service identification of a service, in which the client queries the authentication, and a unique identifier of an authenticator type respectively from the relying party to the client, a checking for a presence of the transmitted authenticator type in a list of authenticator types stored by the client, wherein, when the authenticator type is present, the authenticator is supported in the present method and otherwise an error routine is started. Further, there is effected a supplying of a password by the user employing the client, a requesting of a second challenge message at a token server by the client, and subsequently the transmitting of the requested second challenge message from the token server to the client, a transmitting of the second challenge message from the client to the authenticator, a transmitting of authentication information units from the authenticator to the client, a forwarding of at least a selection of the forwarded authentication information units to the token server, a verifying of the correctness of the selection of the forwarded authentication information units by the token server while employing the second challenge message intermediately stored on the token server, a computing of a user key on the basis of data transmitted from the authenticator, the client and/or the relying party to the token server, a computing of a response message while employing the computed user key, a sending of the response message from the token server to the client and forwarding of at least the response message to the relying party and a verifying of at least the response message by the relying party while employing the user key and the first challenge message intermediately stored by the relying party, and positively authenticating in the case of a positive verification and executing the error routine in the case of a negative verification.

According to the invention, a user authenticates himself vis-à-vis a relying party, thus for example a server or a server service, by means of an authenticator. The authenticator is a unit that is basically capable of generating a key and making it employable for an authentication procedure. The authenticator can basically be present as a data carrier, for example in the form of a smart card, for example an EMV card. The data carrier can also have the form of an integrated SIM card and be present as an eSIM (electronic SIM). Further, the authenticator can also be executed bodilessly in the form of an application or as a software element, for example in the form of control commands that are executed in a secure environment, for example in a so-called eSE (embedded secure element), within a TEE (trusted execution environment) or as an HCE (host card emulation) device.

When the authenticator is present as a card, this card is approached to a reading device, thus to a client. This can happen in wireless or contact-bound manner. The client is connected to the relying party by network technology. Likewise, the client is also connected to the token server by network technology.

Expediently, the client can be a smart phone and the authenticator can be an embedded secure element formed therein. In this case, the authenticator is formed integrally with the mobile terminal, the smart phone. Typically, this is effected by integrating into a smart phone a technical component that is particularly secured against manipulations by hardware technology and/or software technology.

Such an embedded secure element is a security element which has a secure memory that procures physical and logical security mechanisms and guarantees data integrity. Further, a secure runtime environment can be procured in such a security element, so that precisely in such a security element, data can be both safely kept and safely processed.

The proposed method provides that the authenticator or the data carrier is authenticated while employing the client. Thus, the authenticator initiates the authentication while employing the client, wherein this can also be preceded by preparatory method steps. Such a preparatory method step can be, for example, a registration of a user or his authenticator. Here, the user can choose a password himself, which is re-employed in later method steps. Only by way of example reference is already made at this point to FIG. 4, which provides in the method step 104 that the user inputs a password which he has assigned upon registration.

Among other things, the invention results in the advantage that particularly computing-intensive tasks are not carried out directly by the data carrier or the authenticator. Rather, these computing-intensive tasks are outsourced and placed with the token server. Thus, such security-critical computing operations no longer have to be executed in the smart card or the security element, and corresponding hardware restrictions do not apply here.

This is advantageous for smart cards, for example, since smart cards typically have only an induction coil and thus can only temporarily supply an energy supply. A smart card is held in front of a reading device according to known application scenarios, wherein a small current is induced by means of the induction coil in cooperation with the reading device, which current supplies the processor and/or further electronic components. In particular, such smart cards only have limited hardware resources due to their construction type. Consequently, the advantageous technical effect occurs according to the invention that known smart cards or security elements can be re-employed, even if individual method steps provide for complex computing operations. Thus, it is only one of the advantages according to the invention that computing-intensive operations can be outsourced to a specialized token server.

In the present case, this is generally a method for carrying out an authentication of a client vis-à-vis the relying party, wherein the relying party in turn authenticates the client or the user or his data carrier. Overall, however, authentication and authenticating are partly used synonymously in the present case. When interpreting further technical terms as well as the sent messages, preference should be given to the FIDO specifications mentioned at the beginning. The field of specialization has developed its own terminology and typically English terms, some of which are re-employed in this form in the present case. This also makes it possible to embed the proposed method in an existing FIDO framework.

The indicated method steps may be partially known individually, but in the present case the clever sequence in their entirety is made use of, which leads to the result according to the invention exclusively in this manner. In particular, the person skilled in the art recognizes that individual steps can be executed in part iteratively and in part further method steps or transmissions of messages are necessary.

In the following, aspects related to the Universal 2nd Factor U2F framework are introduced.

The invention is also based on the idea of using a data carrier, in particular an EMV card, as a second form factor (U2F), wherein the data carrier is connected to a token server via a client, for example a mobile telephone. The token server can then take over other services, such as, for example, a resource-intensive key derivation, without the requirement to procure a user database.

Accordingly, the invention also relates to a method for carrying out a two-factor authentication between a client and a relying party, comprising the following steps of: carrying out an authentication between the client and the relying party, transmitting additional authentication data from the relying party to the client; requesting a server challenge (EMV Challenge) by the client from a token server; transmitting the server challenge from the token server to the client; carrying out a data exchange between the client and a data carrier, wherein the client receives data-carrier authentication data from the data carrier, wherein the data-carrier authentication data are computed, at least in part, while employing data from the server challenge, transmitting authentication data from the client to the token server, wherein the authentication data comprise data from the data exchange between the client and the data carrier, in particular the data-carrier authentication data, as well as the additional authentication data; verifying the authentication data by the token server; generating an authentication response in the token server; transmitting the authentication response from the token server to the client; and transmitting the authentication response from the client to the relying party and verifying the authentication response by the relying party.

With the method according to the invention, it is particularly advantageously possible to carry out a two-factor authentication while employing the data carrier of the user, wherein the data carrier does not have to be specially adjusted for employment in the two-factor authentication method. Further, it is not necessary to carry out a PIN verification vis-à-vis the data carrier, in particular the EMV data carrier. Further, in the method advantageously a simple token server can be used, which manages without a user database in which data are stored for each user. Consequently, costs can be saved both in the selection of the data carrier and in the selection of the token server. In particular, the aspect of easy selection of the data carrier to be used in the method lowers the entry barrier for the user, since, for example, he can simply use one of his already existing data carriers in the method. Contrary to the usual name, the relying party can also be used as a confirmation instance vis-à-vis a service facility, such as, for example, a web shop, an e-mail service, etc. The relying party then acts as an authentication service, also referred to as authentication-as-a-service (AaaS), wherein the authentication service takes over the (two-factor) authentication for the service facility.

According to the invention, the client is a facility such as a mobile telephone, a tablet PC, a PC or the like. The relying party is a facility such as a host, a server or the like that makes possible access to a service, in particular a secure software application. An example of a relying party is a web service to which a user wishes to gain access, in particular a web shop, a banking access, an e-mail application or the like. In the authentication between the client and the relying party, for example, a user name and a password are queried.

The data-carrier authentication data are, for example, certificates that the client receives from the data carrier, for example an issuer certificate (issuer) and/or a data-carrier-specific certificate, as well as data that are ascertained through a data exchange between the client and the data carrier while making use of data from the server challenge. It can thus be ensured that the data-carrier authentication data also take into account the contents of the server challenge. The data-carrier authentication data can comprise additional data.

The authentication data, which are transmitted from the client to the token server, advantageously comprise both data from the data exchange between the client and the data carrier, thus also the data-carrier authentication data, as well as additional authentication data from the authentication between the client and the relying party. This ensures that the data carrier has actually been present in the data exchange between the client and the data carrier upon receipt of the server challenge. A repeated introduction of the data-carrier authentication data into the authentication data is immediately noticeable, since the data-carrier authentication data are always computed in dependence on the server challenge, wherein the server challenge is changed with each call. Thus, it is advantageously possible to prevent replay attacks, since the token server memorizes the randomly generated server challenge and employs this to verify the data carrier data.

According to one embodiment, when the authentication is carried out between the client and the relying party, a KeyHandle, in particular a UserPrivateKey protected against unauthorized access, in particular an encrypted UserPrivateKey, a challenge, in particular a FIDO challenge, and/or an AppID, in particular a FIDO AppID, are transferred. Based on these data, it is advantageously possible to compute the authentication response. This ensures that the authentication response is computed individually for each two-factor authentication.

Further, the invention can comprise checking the AppID as well as the check with which facility a second factor is to be proven in the authentication. Thus, the client is informed advantageously that, for example, a data carrier can be used as the second factor (U2F). This simplifies the method for the user.

According to a particularly preferred embodiment, no PIN input vis-à-vis the data carrier is required for carrying out the method, in particular for carrying out the data exchange. Instead, the data carrier (U2F) can authenticate itself vis-à-vis the token server and the token server can authenticate itself vis-à-vis the relying party preferably by means of cryptographic methods. The PIN verification of the data carrier vis-à-vis the token server is not required, but can be optionally provided. When an identity document, in particular the German national identity card (nPA) is employed as the data carrier, then a PIN verification vis-à-vis the data carrier and also vis-à-vis the relying party is always necessary, thus a double PIN verification, which can possibly be considered troublesome. For EMV cards, the PIN verification is not mandatory.

According to a further particularly preferred embodiment of the invention, the server challenge has, inter alia, a random number. The random number can be formed, for example, as a 4-byte number. By sending the random number to the client, it is later possible to include the random number in the data-carrier authentication data, for example in the form of a signature. As a result, the token server can advantageously check whether the data carrier was actually "presented" to the client.

Further, according to a preferred embodiment, for carrying out the data exchange between the client and the data carrier, a contactless and/or a contact-type connection between the client and the data carrier can be established. Consequently, it is possible to connect the data carrier to the client via an air interface. For this purpose, an NFC connection between the data carrier and the client can preferably be established by holding the data carrier, for example, to an NFC interface of the client (mobile telephone/tablet PC). Alternatively, the data carrier can be introduced into a card reader of the client (PC) in contact-type manner.

According to a further aspect of the invention, the verification of the authentication data by the token server can prove that the data carrier was physically present during the data exchange between the client and the data carrier. The authentication data are computed taking into account the data-carrier authentication data. The data from the server challenge are included in the data-carrier authentication data. Consequently, the verification of the authentication data can advantageously prove that the data carrier, i.e. the second factor (U2F), was physically present during the data exchange between the client and the data carrier. This fulfills a substantial requirement of two-factor authentication.

According to a further embodiment, when the authentication data are checked by the token server, the token server, upon successful verification, can decrypt a client key from the authentication data, wherein the client key is used in the generation of the authentication response. In the client key there are advantageously included a token server master key that is securely stored in the token server, as well as data that originate exclusively from the data carrier, the relying party and the client. The client key is advantageously a so-called ENC/MAC wrapping key and/or the KeyHandle in which the encrypted FIDO PrivKey is included. Thus, the token server can advantageously be supplied cost-efficiently, since no user data need to be stored in the token server. Only the token server master key must be kept secure in the token server, preferably in an HSM (hardware security module).

According to the invention, a client is provided which is suitable for employment in a method according to the above explanations, wherein the client is a mobile terminal, a tablet PC and/or a PC. According to these embodiments, it is particularly advantageously possible to execute a method according to the invention.

Further, the method according to the invention can be carried out particularly advantageously with a system which is adapted for employment in a method according to the above explanations.

According to a further embodiment, the authentication of the user is not effected directly between the token server and the relying party, but via an intermediary authentication service ("Identity Federation Service"). In this case, the relying party requests the user authentication from the authentication service via an industry-standard federation protocol (e.g. OpenID Connect or SAML). The authentication service will then request authentication from the user with the aid of the client, the token server and the data carrier. The authentication procedure takes place as described above, but takes place vis-à-vis the authentication service and not vis-à-vis the relying party. After successful authentication, the authentication service attests to the authentication vis-à-vis the relying party, possibly supplemented by further identity data or user-specific attestations that the authentication service can carry out due to its stored user data.

In summary, it is possible with the method according to the invention to employ an authenticator having the form of a multiplicity of different data carriers as the second factor; in particular, EMV cards can be employed as the second factor for FIDO-U2F.

The data carriers do not need to have the cryptographic capabilities required for FIDO. Therefore, many persons no longer need to acquire and procure a separate "2nd device". Further, the approval of the issuers of the data carriers (card issuers) for the execution of the method is not necessary. Thus, the method can be implemented without substantial effort.

The required token server does not need a database to store user data/client data. As a result, the token server is simple and cost-efficient. Only an HSM for keeping the token server master key is advantageous.

The method according to the invention is secure against Trojans on the client through employing the server challenge in the computation of the data-carrier authentication data.

A further advantage of the method is that the data carrier only has to be held close to the client while the data exchange between the client and the data carrier is carried out. This minimizes the likelihood of unintentionally interrupted authentications.

DETAILED DESCRIPTION OF VARIOUS EMBODIMENTS

Hereinafter, exemplary embodiments of the invention will first be described in detail with reference to FIGS. 1 to 3. Changes with reference to the method described are possible within the scope of protection defined by the claims.

Figure 1:
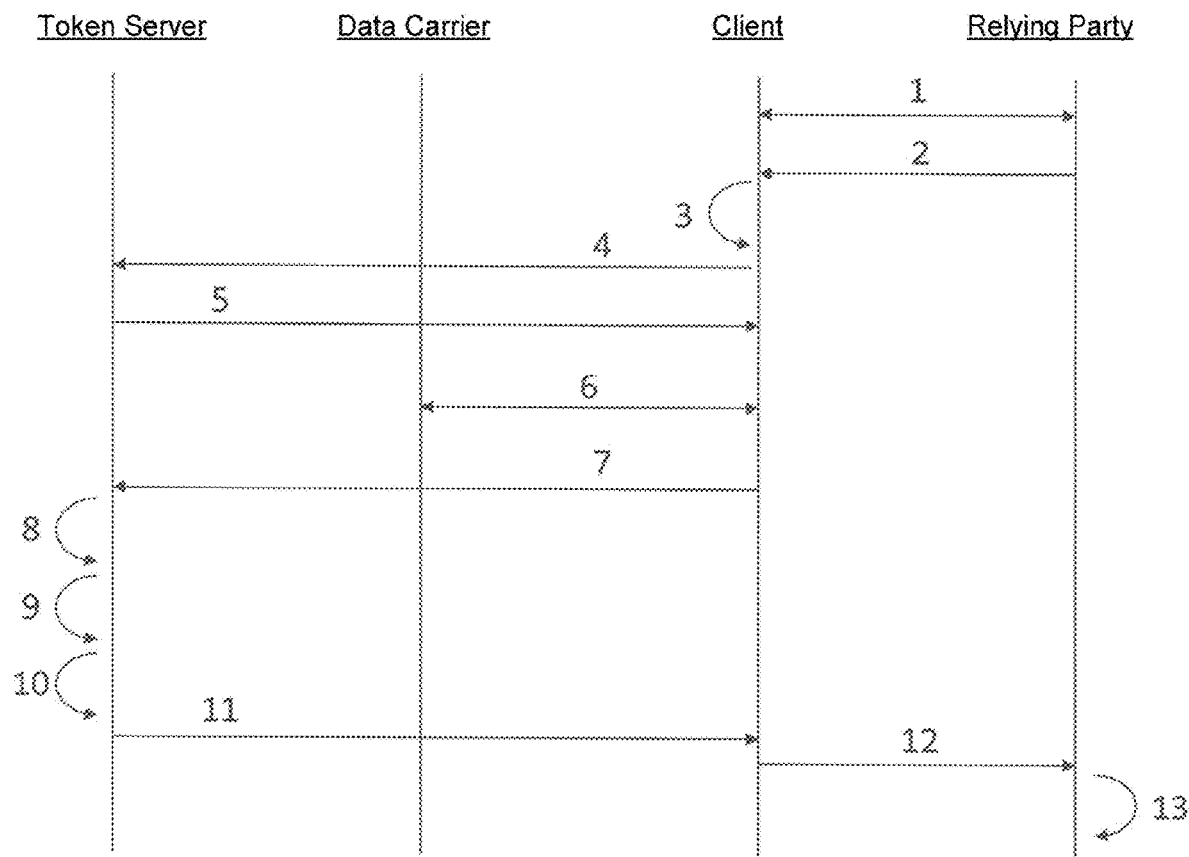
FIG. 1 shows schematically the sequence of a two-factor authentication according to the invention.

FIG. 1 schematically shows the sequence of a two-factor authentication according to the invention between a client and a relying party according to one aspect of the present invention. A client is, for example, a mobile telephone, a tablet PC, a computer (PC) or the like. By way of example, a relying party can be a facility such as a host, a server, or the like that makes possible access to a service, particularly a secure software application.

For the two-factor authentication, the industry standard U2F (Universal Second Factor) is preferably used. The U2F specification is managed by the FIDO Alliance.

In the two-factor authentication according to the invention, first (step 1) an authentication is carried out between the client and the relying party. This can be carried out, for example, by inputting user name and password in a web browser.

In the next step 2, additional authentication data are transmitted from the relying party to the client. The additional authentication data can be, for example, a (FIDO) KeyHandle, a FIDO challenge and a (FIDO) AppID. These terms are sufficiently known from the FIDO standard, for which reason a description is omitted apart from the brief description of the terms below.

The KeyHandle identifies and has the private key (UserPrivateKey) in encrypted form for the subsequent authentication of the user vis-à-vis the relying party. The challenge is a normal challenge for a cryptographic operation, such as, for example, a random number. The AppID identifies the (web) service that the user wants to authenticate to.

In a subsequent, optional step 3, the AppID can be verified. Further, it can be checked in step 3, in which manner the second factor (U2F) can be proven. In the present case, it is assumed that the authenticator has the form of a data carrier and, accordingly, a data carrier is permitted as the second factor.

In a subsequent step 4, the client requests a server challenge from a token server. This server challenge can also be referred to as EMV challenge, if the data carrier to be employed is an EMV card. The server challenge comprises a random number (unpredictable number) supplied by the token server. The random number is, for example, at least 4 bytes long. The server challenge is checked, in particular signed, by the data carrier in a later step 6 (see below). The signature enables the token server to verify whether or not the data carrier has actually been presented to the client. Since the server challenge contains the random number, the possibility of a replay attack by an attacker is made more difficult. In step 4, additional authentication data can be transmitted from the client to the token server within the scope of the server challenge request. Alternatively, these additional authentication data can be transmitted in step 7 (see below). It is irrelevant whether the additional authentication data are transmitted to the token server in step 4 and/or 7.

Subsequently, the server challenge is transmitted from the token server to the client in a further step 5.

Subsequently, a data exchange between the client and the data carrier is carried out (step 6). In the course of the data exchange, the data carrier is brought into connection with the client, for example in contactless or contact-type manner. Data are exchanged between the data carrier and the client. For example, the client can receive at least one certificate from the data carrier, in particular an IssuerPKCert and a CardPKCert.

Further, in step 6, the client sends the server challenge to the data carrier, wherein the data carrier computes data-carrier authentication data and the server challenge is included in the computation of the data-carrier authentication data. Since the server challenge is included in the computation of the data-carrier authentication data, the random number from the server challenge is also included in the computation. According to the invention, the client only accepts the data-carrier authentication data from the data carrier without checking them, since according to the invention the check is effected in the token server (steps 8 to 10) at a later time. At the later time of the check in the token server, it is no longer necessary to connect the data carrier to the client.

In a subsequent step 7, authentication data are transmitted from the client to the token server, wherein the authentication data comprise data from the data exchange between the client and the data carrier, in particular the data-carrier authentication data, as well as the additional authentication data. Data originating from the exchange with the data carrier can comprise, for example, the IssuerPKCert, the CardPKCert, and the data-carrier authentication data. Data originating from the exchange with the relying party can comprise the KeyHandle, a hash of the AppID, as well as a hash of the client data, wherein the client data have the original (FIDO) challenge.

The authentication data transmitted to the token server are verified by the token server in a next step 8. During the check, the token server can check the IssuerPKCert with the aid of a present "Payment Scheme Public Key", the CardPKCert with the aid of the "Issuer Public Key" that has now been checked and the data-carrier authentication data with the aid of the "Card Public Key" that has now been checked.

If all checks are successful, it is ensured that the data-carrier authentication data originate from or were signed by an authentic data carrier, for example an EMV card, i.e. the corresponding data carrier was actually presented. For example, when employing an EMV card, the token server can convince itself that the data Primary Account Number, PAN Sequence Number (optional) and Expiry Date, which uniquely identify an EMV card, originate from the employed EMV card. In this context, the token server executes steps that would be carried out by the terminal in a known EMV transaction.

In the case of a successful verification, the token server decrypts a client key from the authentication data in a next, optional step 9. For this purpose, the token server can, for example, decrypt the User Private Key (also referred to as client key) which is contained (together with possibly other data) in the present key handle (see above). The preferably required (symmetric) key "KWrap" for decrypting KeyHandle can be derived from the following data: master key (main key) of the token server, personal account number (PAN), (optional) PAN Sequence Number, (optional) ExpiryDate, (optional) further data. For example, according to an alternative, the key "KWrap" can be the result of the encryption or decryption of a hash value over the card data (PAN, PAN Sequence Number, Expiry Date, etc.).

All user-related data employed for the key derivation originate from the client, the data carrier or the relying party. A user database does not need to be procured in the token server. This makes it possible to configure the token server in simple manner and, as a result, to configure the token server more cost-efficiently. Only the master key of the token server to be employed according to a preferred embodiment must be kept secure in order to guarantee the security of the method. An HSM (hardware security module) lends itself for this purpose.

Subsequently, in a next step 10, an authentication response is generated in the token server. The authentication response serves to confirm the authenticity of the second factor (U2F), in the present case of the data carrier. In the present embodiment example the (FIDO) authentication response message can be generated with the aid of the user private key, which is a signature with the aid of the user private key over a hash(AppID), a hash(client data), wherein with this hash also the original FIDO challenge of the relying party is indirectly signed, a counter (application transaction counter of the EMV card), etc.

Thereafter, the authentication response is sent possibly in connection with other data to the client in a subsequent step 11 and sent from there to the relying party in a further step 12. Alternatively, the authentication response can also be sent directly to the relying party.

The relying party then checks (step 13) the authentication response; in the aforementioned embodiment example the relying party checks the (signature of the) (FIDO) authentication response. The relying party employs the user public key (client key) for this purpose. This check can be effected according to the FIDO standard and will therefore not be explained further.

Figure 2:
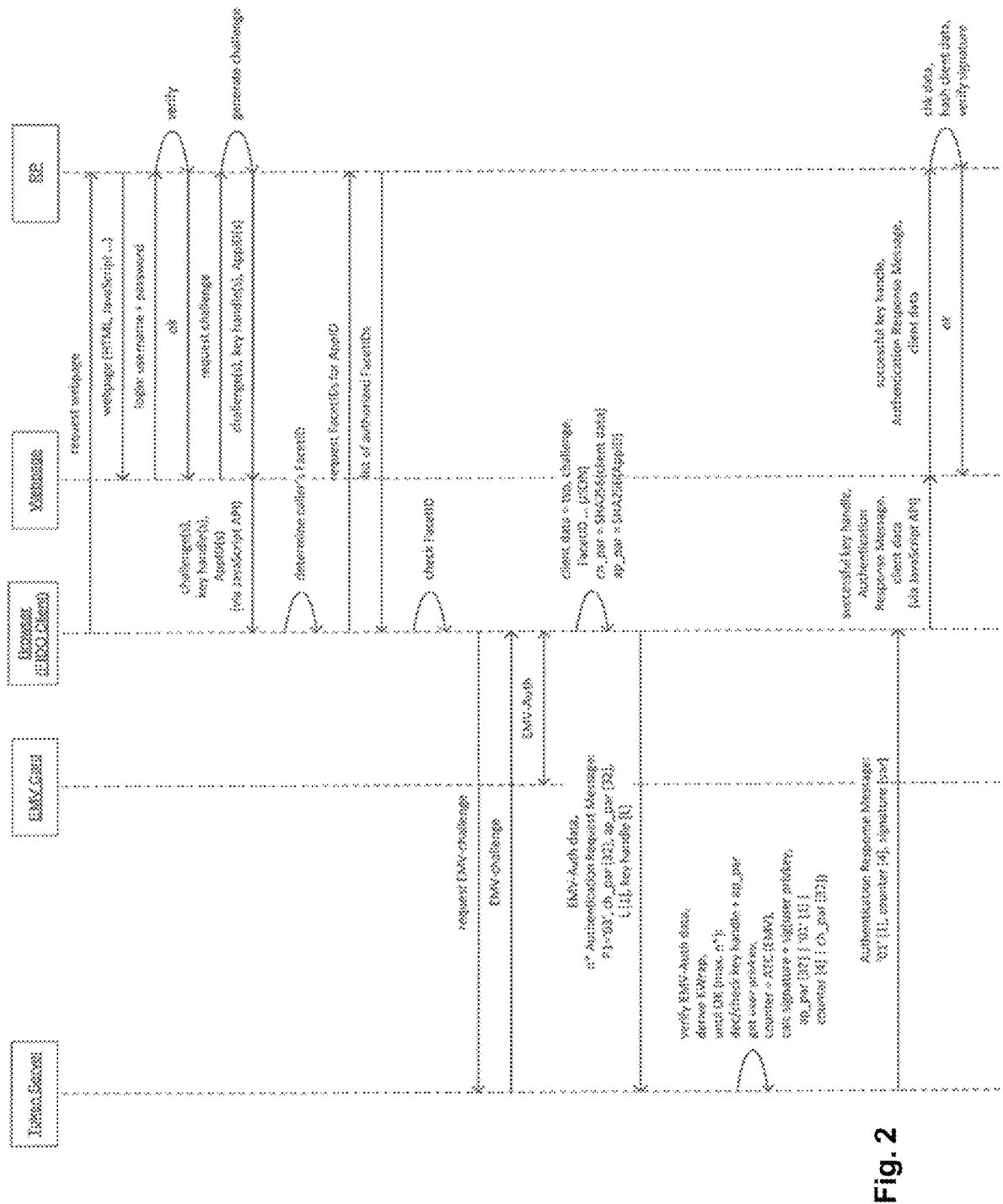
FIG. 2 shows the sequence of a two-factor authentication according to the invention in a more detailed representation.

FIG. 2 shows the sequence of an authentication according to the invention when employing an EMV card as the authenticator according to one aspect of the present invention. An EMV card is usually a payment card that is formed according to the EMV specification (Europay International, MasterCard and VISA). EMV cards are currently specified so as to be incapable of computing elliptic curves which are applied in asymmetric crypto systems and which are required in a FIDO-U2F authentication.

Accordingly, the method according to the invention is suitable, inter alia, when employing an EMV card (data carrier) as the second factor (U2F), since the EMV card can outsource the computation required by FIDO in cooperation with a token server.

Thus, FIG. 1 shows a method for carrying out a two-factor authentication between a client and a relying party, comprising the following steps of:

carrying out 1 an authentication between the client and the relying party;

transmitting 2 of additional authentication data from the relying party to the client;

requesting 4 a server challenge by the client from a token server;

transmitting 5 the server challenge from the token server to the client;

carrying out 6 a data exchange between the client and a data carrier, wherein the client receives data-carrier authentication data from the data carrier, wherein the data-carrier authentication data are computed at least in part while employing data from the server challenge, transmitting 7 authentication data from the client to the token server, wherein the authentication data comprise data from the data exchange between the client and the data carrier, in particular the data-carrier authentication data, as well as the additional authentication data;

verifying 8 the authentication data by the token server;

generating 10 an authentication response in the token server;

transmitting 11 the authentication response from the token server to the client; and transmitting 12 the authentication response from the client to the relying party and verifying 13 the authentication response by the relying party.

According to a further aspect of the invention, it is provided that when carrying out the authentication between the client and the relying party a KeyHandle, in particular a UserPrivateKey, a challenge and/or an AppID are transferred.

According to a further aspect of the present invention, it is provided that no PIN input vis-à-vis the data carrier is required to carry out the method.

According to a further aspect of the present invention, it is provided that the server challenge has a random number.

According to a further aspect of the present invention, it is provided that a contactless and/or a contact-type connection between the client and the data carrier is established for carrying out the data exchange between the client and the data carrier.

According to a further aspect of the present invention, it is provided that the verification of the authentication data by the token server proves that the data carrier was physically present during the data exchange between the client and the data carrier.

According to a further aspect of the present invention, in the verification of the authentication data by the token server, the token server decrypts (10) a client key from the authentication data, in particular from the additional authentication data, wherein the client key is employed in the generation of the authentication response.

According to a further aspect of the present invention, it is provided that no user data are stored in the token server.

According to a further aspect of the present invention, it is provided that the token server generates the authentication response with the aid of user data originating exclusively from the client, the data carrier and/or the relying party.

According to a further aspect of the present invention, it is provided that no PIN verification is necessary for the data exchange between the client and the data carrier.

Further, according to one aspect of the invention, the method includes the step of verifying whether a two-factor authentication is permitted with the data carrier as the second factor.

According to a further aspect of the present invention, a client is proposed which is suitable for employment in a method according to one of the preceding claims, wherein the client is a mobile terminal, a tablet PC and/or a PC.

According to a further aspect of the present invention, a system adapted for employment in a method according to any of the preceding claims is proposed.

According to a further aspect of the present invention, a token server is proposed which is suitable for employment in a method according to any of the preceding claims.

FIG. 2 shows in this context the exemplary sequence of a two-factor authentication according to the invention, in which a user attempts to log into a web page of a relying party in a browser (FIDO client). The steps shown in FIG. 2 substantially correspond to the steps explained in FIG. 1, for which reason a repeated detailed description is omitted.

Figure 3:
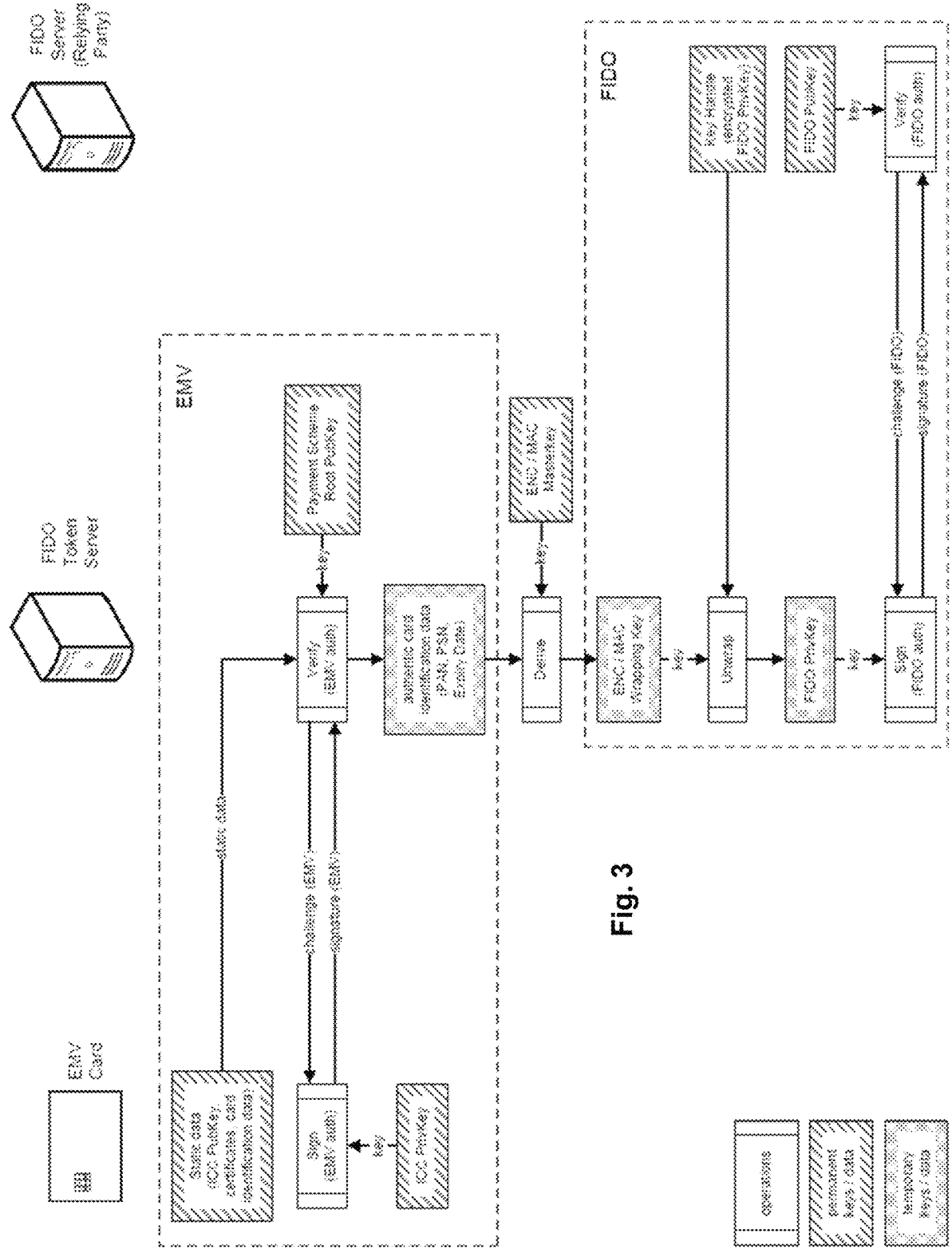
FIG. 3 shows a flowchart representing a two-factor authentication according to the invention.

FIG. 3 shows a flowchart which represents the two-factor authentication according to the invention, wherein, analogously to FIG. 2, likewise an EMV card is used as the data carrier. The sequences in FIG. 3 substantially correspond to the sequences shown in FIGS. 1 and 2, for which reason a repeated description is omitted.

Hereinafter, exemplary embodiments of the invention will be described in detail with reference to FIGS. 4 to 8. These apply in particular to the claimed method for carrying out a cryptographically secured authentication or to the analogously set up system arrangement. In each case, the person skilled in the art recognizes that the method proposes method steps which can be structurally modeled by the system arrangement such that the same functionality is supplied. Further, the proposed physical units of the system arrangement can be modeled as method steps in terms of their functionality. Thus, the method is suitable for operating the claimed system arrangement and the system arrangement is suitable for carrying out the claimed method.

Figure 4:
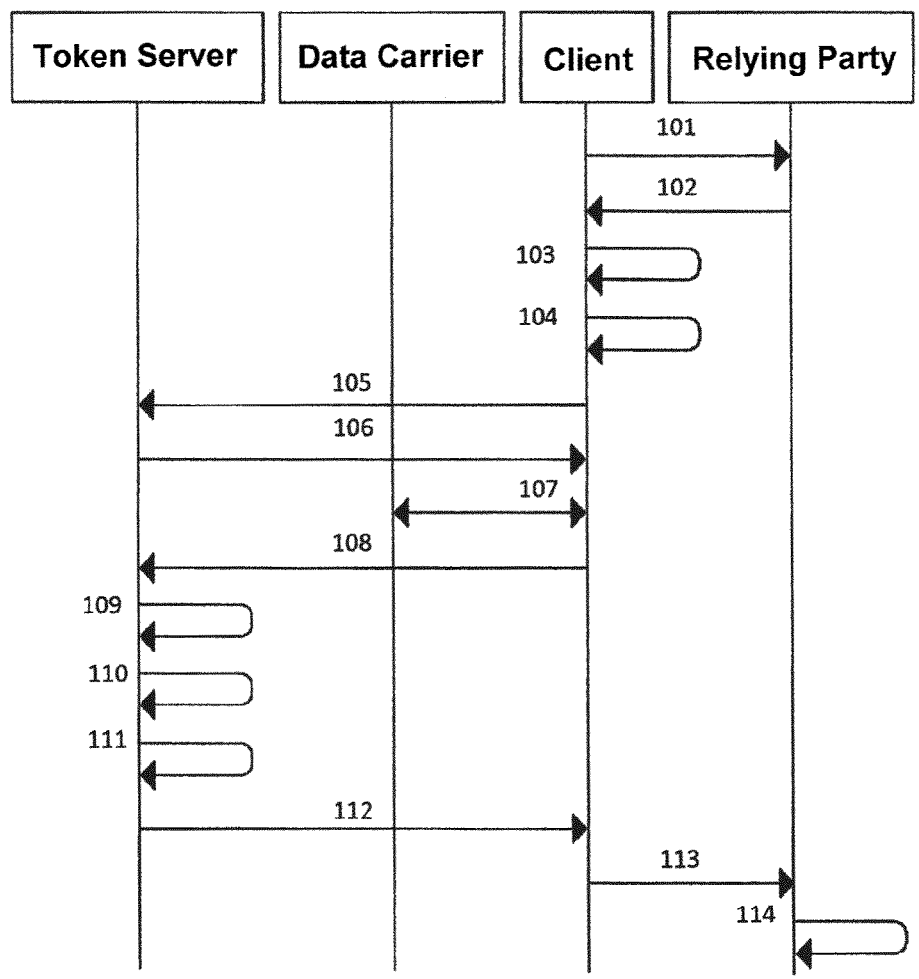
FIG. 4 shows a sequence diagram to illustrate the method according to the invention for carrying out a cryptographically secured authentication according to the Universal Authentication Framework.

FIG. 4 shows a sequence diagram of the claimed method of a cryptographically secured authentication. In this case, the tasks described above are solved, in particular that complex computing operations are outsourced to a server and that it is not immediately apparent whether an incorrect PIN was input or an incorrect EMV card was used or an authentication was attempted vis-à-vis an incorrect relying party.

The tasks are solved by using EMV cards as UAF authenticator. The interaction required in the FIDO standard is to produce the EMV card vis-à-vis the "Local Device" and additionally to input a password. In the case of an NFC-enabled smart phone, this can be approaching the EMV card to the smart phone; in the case of a PC this can be inserting the EMV card into a card reading device.

Linking up via NFC (near field communication) or in contact-type manner are possible interfaces, but the solution is independent of the form factor of the EMV card, i.e. alternatively, it can also be present as an eSE (embedded secure element), within a TEE (trusted execution environment), as an HCE (host card emulation) device or as a "wearable" (e.g. a smart watch with Bluetooth linking).

However, EMV cards are not laid out for employment with FIDO, but rather for EMV transactions. In order to be employable nevertheless as a UAF authenticator, according to one aspect of the present invention, a so-called "token server" is added to the system. According to one aspect of the present invention, this token server takes over the derivation of the FIDO key and the generation of the FIDO signature according to the FIDO protocol. The system is structured so that the token server does not contain any kind of user database; thus, the token server can be realized cost-efficiently. In addition, it is not possible to capture any stored user data when attacking the token server.

The protection of the authenticator against unauthorized employment required by FIDO UAF is guaranteed by a password input by the user being included in the derivation of the key on the part of the token server.

Step 101: Since the method according to the invention preferably relates to a primary authentication according to FIDO UAF by means of a cryptographic key, the relying party does not know at the beginning of the authentication which registered user wants to authenticate himself. Therefore, unlike FIDO U2F, where the user is identified by a previous primary authentication (by means of username/password), the relying party is not able to supply to the user data that are user-specific and can, for example, serve to decrypt a user-specific key, as is possible with FIDO U2F.

Step 102: The client receives from the relying party
a FIDO Challenge
a(n) (FIDO) AppID, as well as
at least one criterion for the selection of the allowed authenticators, expediently the AAIDs of the allowed authenticator types.

Explanations: The FIDO challenge is a normal challenge for a cryptographic operation, thus, for example, a random number. The AppID identifies the (web) service that the user wants to authenticate to. In practice, the AppID is frequently (but not always) simply the URL of the web service. (For example: www.companyname.de). The AAID (authenticator attestation identifier) is a unique identifier for an authenticator type. It is composed preferably of a manufacturer identifier and product identifier.

Step 103: In this step, it is checked whether the authenticator is accepted by the relying party. For this purpose, the policy of the relying party in the authentication query is checked as to whether the AAID (authenticator attestation identifier) is contained in the list of allowed authenticators. In this case, the check yields that producing an EMV card is supported. When the authentication is carried out by means of an EMV card, for example, it is checked whether the criteria for the selection of an authenticator sent by the relying party permit the use of an EMV card.

Step 104: The user inputs a self-selected password, which he has assigned upon registration.

Step 105: The client requests an EMV challenge from the token server.

EMV challenge: ={"unpredictable number" (at least 4 bytes) and optionally further data, such as amount of money, transaction date}

The EMV challenge will be signed by the EMV card in a later step. With the aid of the signature, the token server can then verify that the EMV card was actually "presented" to the client. Since the EMV challenge contains at least a "4 byte unpredictable number", a Trojan/attacker cannot carry out a replay attack on the client, i.e. producing the EMV card is indispensable.

Step 106: The client receives an EMV challenge from the token server.

Step 107: The user is requested to produce the EMV card vis-à-vis the client (contactlessly: hold to the client, contact-type manner: insert into the card reader). Once a connection has been established between the client and the EMV card, a standard EMV authentication is carried out (type: "Dynamic Data Authentication" or "combined DDA/AC generation").

Within the scope of this EMV authentication, the client initially receives two certificates from the EMV card:
1. (EMV) IssuerPKCert: ={Issuer Public Key, signature with payment scheme private key}
2. (EMV) CardPKCert: ={Card Public Key, personal account number (PAN), PAN Sequence Number (optional), Expiry Date, signature with issuer private key}

The client subsequently sends the EMV challenge to the EMV card and receives back the EMV authentication data, which, among other things, contain a signature over the EMV challenge computed by the EMV card, in particular also over the unpredictable number:

3. EMV authentication data: ={unpredictable number, signature with card private key}

The client can only accept the above data, but cannot check them, since the "Payment Scheme Public Key" necessary for this purpose is not present. Instead, the check takes place in the token server at a later time.

Step 108: The data necessary to check the EMV authentication and to carry out the remaining steps of the FIDO authentication are transmitted to the token server:
  IssuerPKCert (EMV)
  CardPKCert (EMV)
  EMV authentication data (EMV)
  FIDO authentication request (according to FIDO, i.a. with AppID, FIDO challenge)
  (possibly further data).

Step 109: The token server checks
  IssuerPKCert with the aid of the present "Payment Scheme Public Key".
  CardPKCert with the aid of the now checked "Issuer Public Key".
  EMV authentication data with the aid of the now checked "Card Public Key".

If all checks are successful, it is ensured that the EMV authentication data originate from or were signed by an authentic EMV card, i.e. the corresponding EMV card was actually presented. In particular, the token server has been convinced that the data Primary Account Number, PAN Sequence Number (optional) and Expiry Date, which uniquely identify an EMV card, originate from the employed EMV card.

Step 110: The token server derives the user private key (for carrying out the authentication according to FIDO UAF) and the key ID (identifies the key according to the FIDO UAF protocol) from the following data:
  master key of the token server
  Primary Account Number (PAN)
  password, or password hash of the user
  App ID of the relying party (identifies the web service vis-à-vis which an authentication is being carried out)
  (optionally) PAN Sequence Number
  (optionally) Expiry Date
  (optionally) additional data.

It should be noted that all RP- or user-specific data employed for the key derivation originate from the relying party (App-ID) or the user (password) and the EMV card. From the token server, only non-individual data are included in the key derivation, in particular the master key. This eliminates the need for a user database in the token server, making it much simpler and more cost-efficient than the otherwise usual servers. Also a management of the user data is omitted, since these are not present at all.

However, optionally, additional data can be stored on the token server to make possible extended functionality.

Optionally, the derivation of the key ID can be effected exclusively by the AppID and the data of the EMV card, without taking account of the user password, but the derivation of the authentication key while taking account of the user password. In the case of different passwords, this results in an identical key ID despite different authentication keys, and the relying party can thereby recognize failed authentication attempts, such as occurring, for example, in a brute-force attack with a card stolen from the user, allocate said attempts to an account and react accordingly, for example by locking the account for a certain time.

The check whether the AppID, user password and the employed card are identical to the values employed upon registration, is effected implicitly, since, if the values are incorrect, the key derivation leads to a key that is not registered with the relying party and thus leads to an invalid signature, which is recognized and rejected by the relying party in step 14.

However, to guarantee the security of the service, according to one aspect of the present invention, the token server master key must be kept secure. For this purpose, an HSM (hardware security module) lends itself.

Step 111: The required FIDO authentication response message is generated with the aid of the now present user private key. This is a signature with the aid of the user private key over the data transferred from the client to the token server according to the FIDO UAF protocol. These include in particular:
  hash(AppID, FacetID (=ID of the calling application), challenge from the FIDO Server)
  KeyID—this makes it possible for the relying party to identify the public key stored for the user on the part of the relying party (possibly further data according to FIDO UAF, such as optional transaction data, channel binding).

Steps 112 and 113: The FIDO authentication response message is sent from the token server to the client (step 12) and from there, along with other data, to the relying party (step 13).

Step 114: The relying party checks—inter alia—the (signature of the) FIDO authentication response message with the aid of the public user key corresponding to the user private key, i.e. the user public key which is identified via the KeyID in the FIDO response. This preferably corresponds to the FIDO standard and therefore will not be explained in further detail. If the user has input an incorrect password, has carried out the authentication vis-à-vis an incorrect web service (incorrect AppID) or with an incorrect card, the authentication will fail.

The person skilled in the art recognizes here that the method steps 101 to 114 can comprise further method steps. The described sequence of method steps can be implemented as a message protocol. Further, it is possible to set up the data carrier as an embedded secure element and to integrate this security element, for example, in a mobile terminal, permanently, i.e. integrally.

Figure 5:
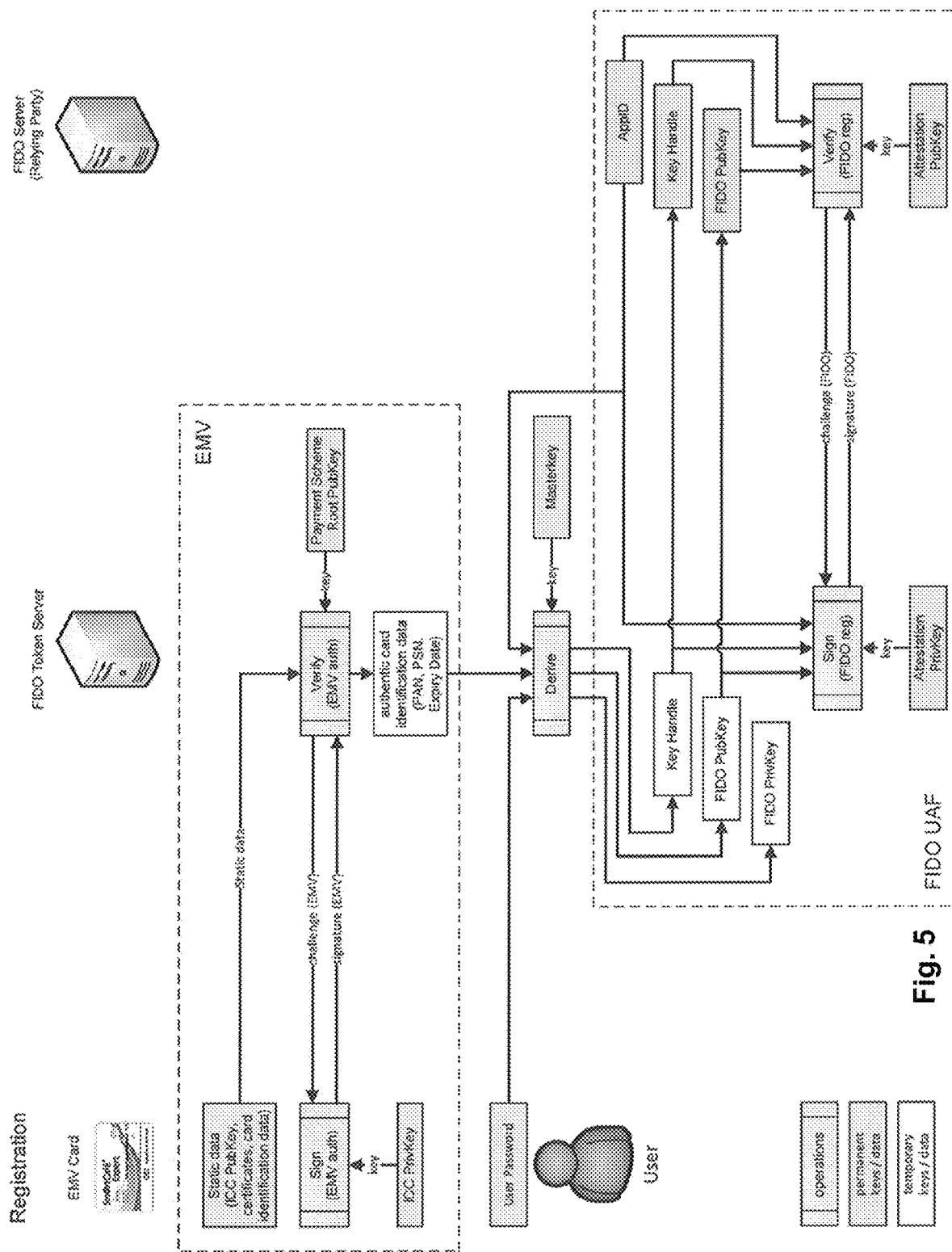
FIG. 5 shows a registration process within the scope of the proposed method for carrying out a cryptographic authentication.

FIG. 5 shows a schematic flowchart of a registration process according to one aspect of the method for carrying out a cryptographically secured authentication. In this case, there is drawn the data carrier as an EMV card on the upper left, the token server in the upper middle and the relying party as a FIDO server on the upper right side.

FIG. 5 illustrates the message flow, which is used by way of example for realizing the proposed method. The parameters or message designations employed according to FIGS. 5, 6, 7 and 8 correspond to the FIDO specifications introduced at the beginning.

What is not shown in FIG. 5 is the client; however which is implied by the EMV card entering into a message exchange with the token server. The messages employed correspond to the parameters introduced in the context of FIG. 4.

Figure 6:
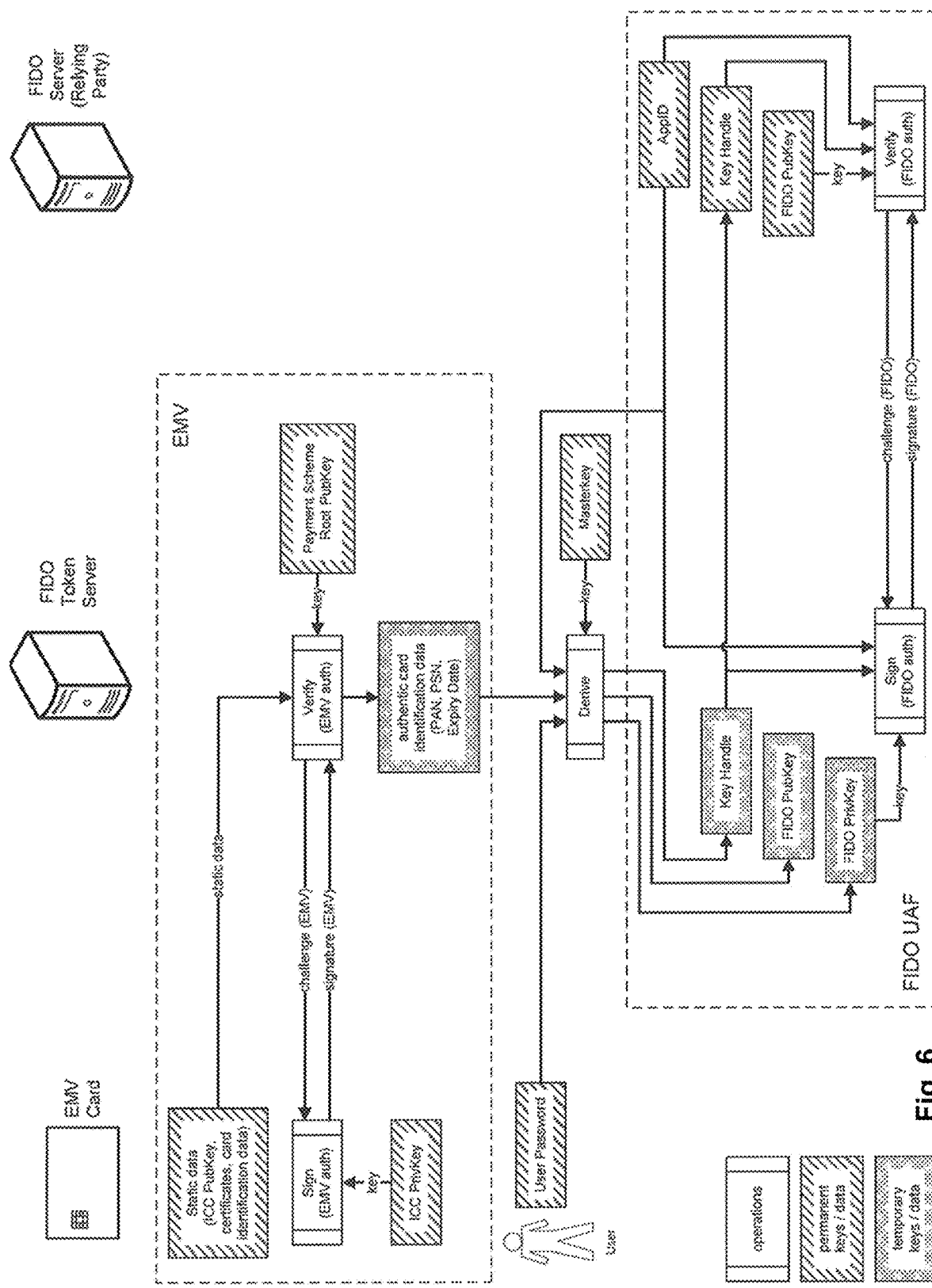
FIG. 6 shows a sequence of an authentication according to the proposed method.

FIG. 6 likewise shows a schematic flowchart of an authentication according to the proposed method for carrying out a cryptographically secured authentication. Here again the parameters already introduced in the context of FIG. 4 are illustrated and in particular the message exchange between the involved components is illustrated.

Figure 7:
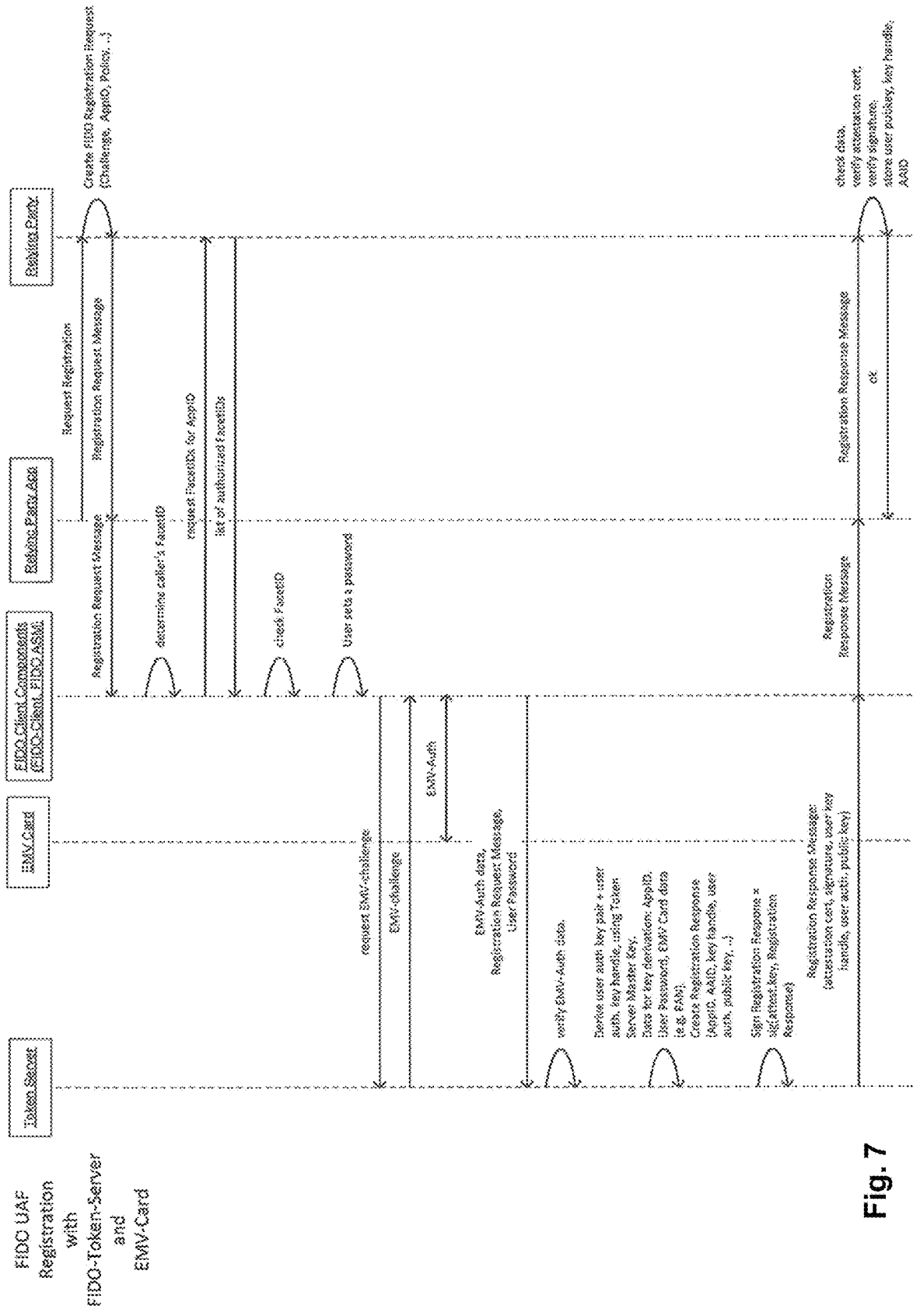
FIG. 7 shows a further sequence diagram with further involved technical components according to the claimed method.
Figure 8:
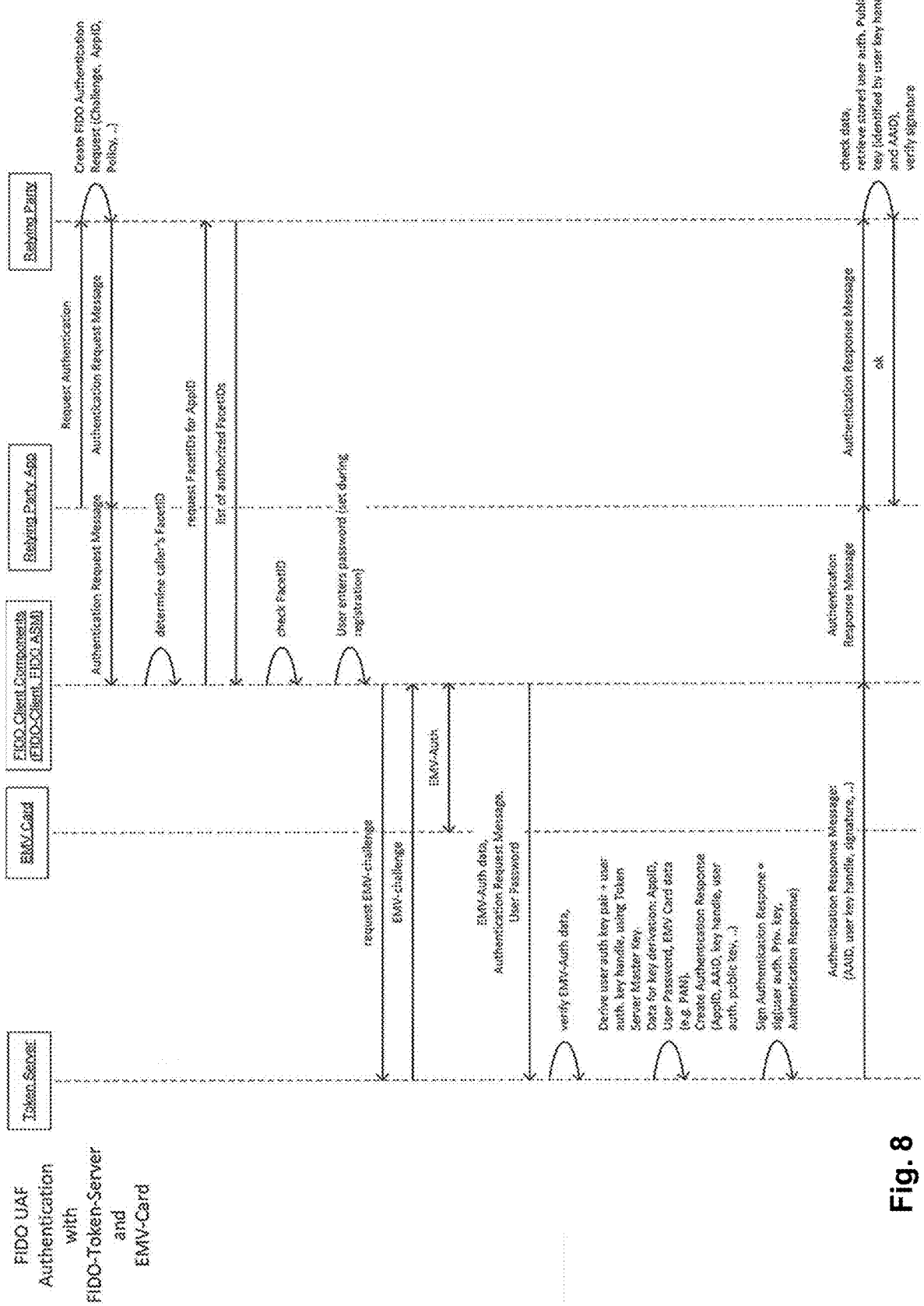
FIG. 8 likewise shows a sequence diagram according to the proposed method.

The FIGS. 7 and 8 each show a sequence diagram, which respectively represent embodiments of the sequence according to FIG. 4. As can be seen from the FIGS. 7 and 8, the EMV card corresponds to the data carrier, wherein the client is present as a FIDO client with a plurality of components. The relying party also has been represented in more detail in such a manner that it is divided into an application (relying party app) present on the device of the user on the part of the client and into a server. The relying party drawn on the right can also be a server within the meaning of a software process. Since the message flow is substantially similar to the message flow of FIG. 4, reference is made to the description according to FIG. 4 for the description of the present sequence diagrams. Thus, the steps 101 to 114 according to FIG. 4 are taken up in the FIGS. 7 and 8 and represented with the respective technical designation. Thus, the respective message transmissions according to FIGS. 7 and 8 can be allocated to the method steps 101 to 114 in a simple manner.

In general, the proposed method has some technical advantages over the prior art, which are summarized again in the following merely by way of example.

EMV cards can now be used as a primary authentication factor for FIDO UAF, even if they do not have the cryptographic capabilities required for FIDO. Thus, many persons no longer need to acquire and keep ready a "2nd device". Since this is a primary authentication, the user no longer has to memorize a user name, since the user is implicitly identified after the successful authentication. The management of security-critical access data (e.g. unlocking of passwords) on the part of the relying party is omitted, since the authentication vis-à-vis the relying party is effected only with the aid of a cryptographic key. On the part of the client no management of a password has to be effected either, since an invalid signature automatically results when a faulty password is employed. The approval of the card issuers is not necessary for this; the method can thus already be implemented. The required token server does not need a database; it is thus simple and cost-efficient. Merely an HSM for keeping the token server master key is recommended.

The method is also secure against Trojans on the client with respect to the theft of sensitive data, since no data at all are stored on the client. The method allows the client to be changed without having to transfer data from one client to the other. Contactless EMV cards only have to be held close to the client for a very short time; this minimizes the likelihood of unintentionally interrupted authentications. The FIDELIO/nPA solution requires a longer transaction time with the nPA due to the data transfer in the background. The method can be expanded in perspective also to other card types and other protocols.

The invention claimed is:

1. A method for carrying out a cryptographically secured authentication between a client and a relying party, having the steps of:
   initiating an authentication request by the client at the relying party;
   transmitting a first challenge message, a service identifier of a service at which the client requested authentication, and at least one criterion for selecting an accepted authenticator type from the relying party to the client;
   checking an authenticator type of an authenticator by the client on the basis of the at least one transmitted criterion,
   the client requesting a password from a user in response to the authenticator being the accepted authenticator type, and
   the client initiating an error routine in response to the authenticator not being the accepted authenticator type;
   supplying the password at the client by the user;
   transmitting a second challenge message request from the client to a token server;
   transmitting the requested second challenge message from the token server to the client;
   transmitting authentication information units from the authenticator to the client;
   forwarding at least a selection of the transmitted authentication information units from the client to the token server;
   verifying the selection of the forwarded authentication information units by the token server;
   computing a user key by the token server on the basis of data transmitted from the authenticator, the client, and/or the relying party to the token server;
   computing a response message employing the computed user key by the token server;
   sending the response message from the token server to the client, the client forwarding at least the response message to the relying party; and
   verifying at least the response message by the relying party,
      the relying party positively authenticating the client in response to a positive verification of at least the response message; and
      the relying party executing the error routine in response to a negative verification of at least the response message.

2. The method according to claim 1, wherein after the transmitting of the requested second challenge message from the token server to the client, the second challenge message is transmitted from the client to the authenticator; and
   the authentication information units are created by the authenticator in dependence on the second challenge message.

3. The method according to claim 1, wherein the checking of the authenticator type of the authenticator by the client is performed on the basis of a list of authenticator types available for the client.

4. The method according to claim 1, wherein the authenticator comprises a portable data carrier, an EMV card, a smart card, an embedded secure element, a trusted secure environment or an application or control commands.

5. The method according to claim 1, wherein the token server generates an authentication token in dependence on the supplied password, wherein the authentication token is checked by the relying party only in a subsequent method step.

6. The method according to claim 1, wherein the error routine triggers an abortion of the method or a restart of the method.

7. The method according to claim 1, wherein the transmitted messages comply with the universal authentication framework (UAF) specification family of the Fast Identity Online (FIDO) Alliance, Inc.

8. The method according to claim 1, wherein the transmitted messages comply with the universal authentication framework (UAF) specification 1.1, Fast Identity Online (FIDO) UAF Protocol Specification and/or FIDO 2.0 specifications of the FIDO Alliance, Inc.

9. The method according to claim 1, wherein a signature is computed over the second challenge message.

10. The method according to claim 1, wherein the transmission of authentication information units from the authenticator to the client is preceded by a selection of the authenticator by the client.

11. The method according to claim 10, wherein during the further authentication the client receives certificates from the authenticator.

12. The method according to claim 1, wherein the supplied password is transmitted to the token server from the client.

13. A mobile terminal having an embedded secure element according to claim 12.

14. The method according to claim 1, wherein the computing of the user key comprises computing a key identifier, wherein the supplied password can be employed.

15. An embedded secure element for employment as an authenticator in a method according to claim 1.

16. A computer program product with control commands that execute the method according to claim 1 when executed on a computer.

17. A system arrangement for carrying out a cryptographically secured authentication between a client and a relying party, having:

the client configured to initiate an authentication request at the relying party;

the relying party configured to transmit a first challenge message, a service identifier of a service at which the client requests authentication, and criteria for selecting accepted authenticator types to the client;

the client configured to check an authenticator type of an authenticator, wherein, the client is configured to request a password from a user in response to the authenticator being the accepted authenticator type, and the client is configured to initiate an error routine in response to the authenticator not being the accepted authenticator type;

the client configured to request a second challenge message at a token server and the token server configured to subsequently transmit the requested second challenge message from the token server to the client;

the authenticator configured to transmit authentication information units from the authenticator to the client;

the client configured to forward at least a selection of the transmitted authentication information units to the token server;

the token server configured to verify a selection of the forwarded authentication information units;

the token server configured to compute a user key on the basis of data transmitted from the authenticator, the client, and/or the relying party to the token server;

the token server configured to compute a response message employing the computed user key;

the token server configured to send the response message from the token server to the client and forward at least the response message via the client to the relying party; and the relying party configured to verify at least the response message employing the user key and to positively authenticate in response to a positive verification and to execute the error routing routine in response to a negative verification.

* * * * *